May 3, 1932.  P. D. MORGAN  1,856,818
FISH RECEPTACLE
Filed Dec. 31, 1929  4 Sheets-Sheet 1
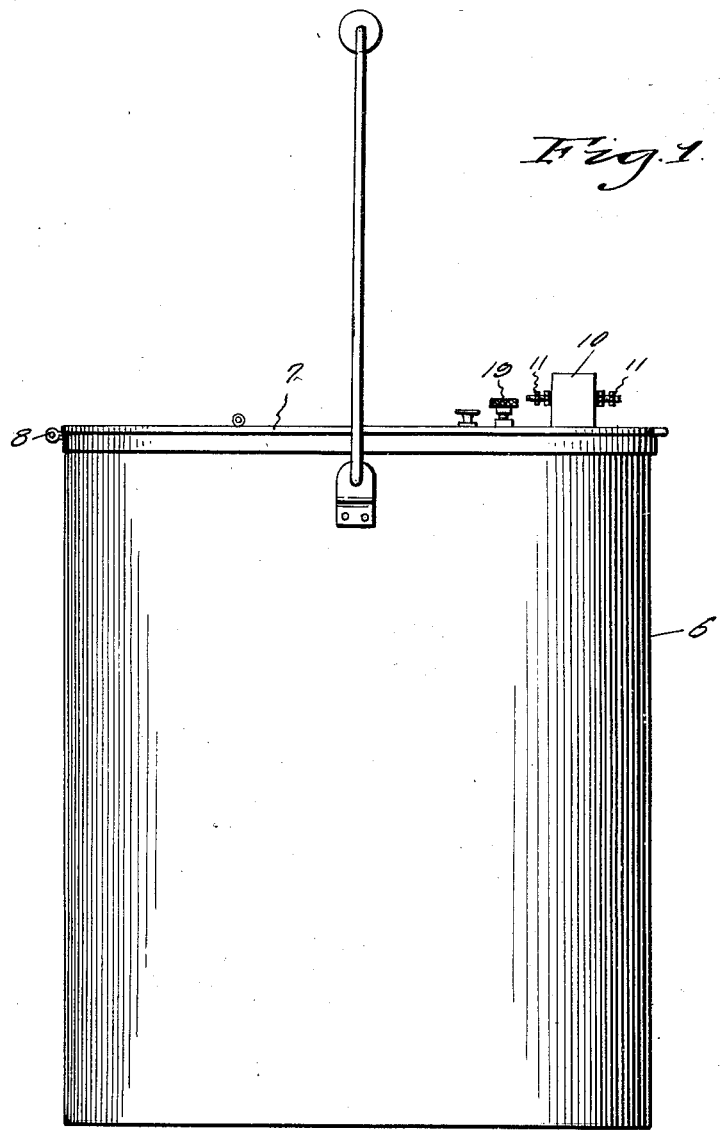
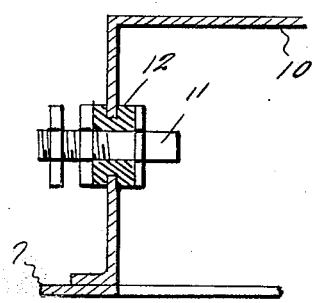
Inventor
Philander D. Morgan
By Clarence A. O'Brien
Attorney

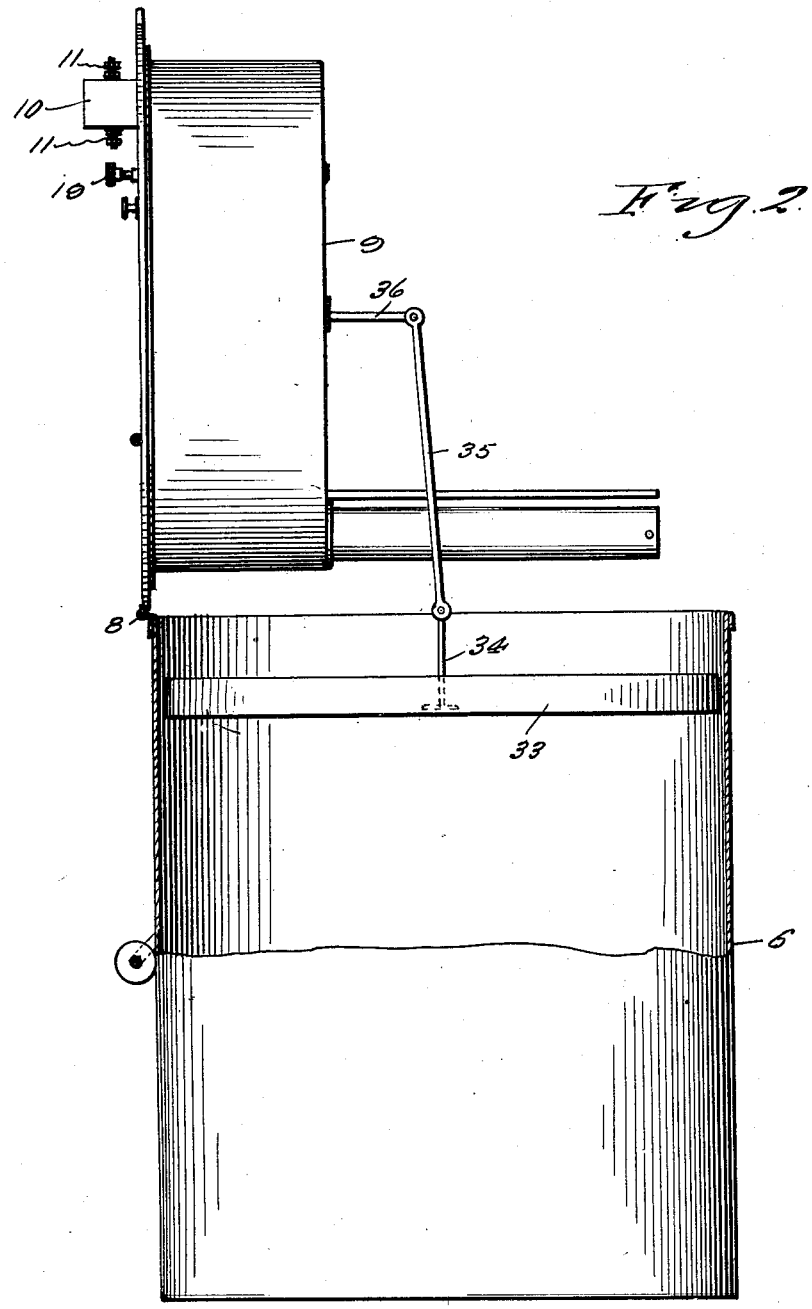

May 3, 1932. P. D. MORGAN 1,856,818
FISH RECEPTACLE
Filed Dec. 31, 1929 4 Sheets-Sheet 3

Fig. 3.

Inventor
Philander D. Morgan

By Clarence A. O'Brien
Attorney

May 3, 1932.  P. D. MORGAN  1,856,818
FISH RECEPTACLE
Filed Dec. 31, 1929   4 Sheets-Sheet 4
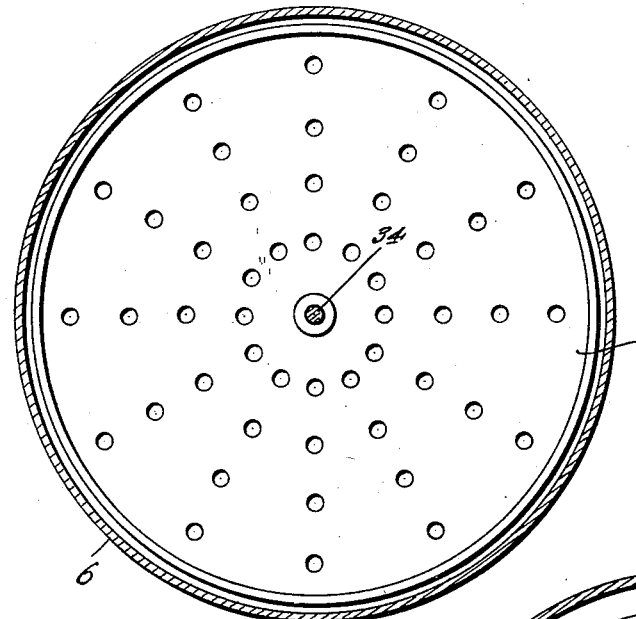
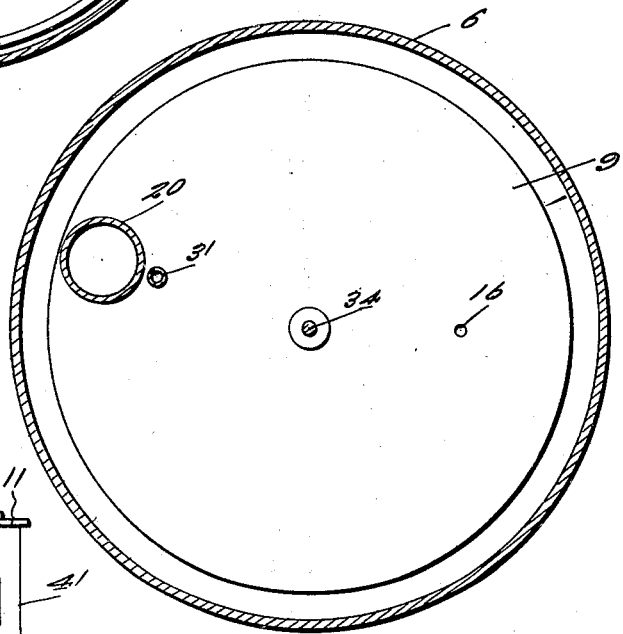
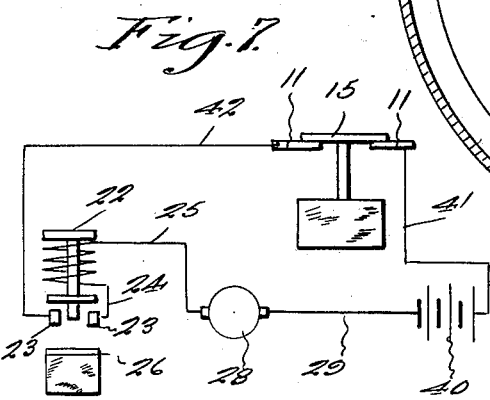
Inventor
Philander D. Morgan
By Clarence A. O'Brien
Attorney Patented May 3, 1932

1,856,818

UNITED STATES PATENT OFFICE

PHILANDER D. MORGAN, OF BATON ROUGE, LOUISIANA

FISH RECEPTACLE

Application filed December 31, 1929. Serial No. 417,718.

The present invention relates to a receptacle for storing fish and has for its prime object to provide means for causing a constant circulation of water in the receptacle so that the same water may be used therein for storing fish alive for an indefinite time.

Another very important object of the invention resides in the provision of a fish receptacle of this nature with water circulating means operable in an automatic manner using a storage battery or the like as a source of energy.

Another very important object of the invention resides in the provision of a fish receptacle of this nature with means therein so that the fish may be easily removed therefrom when desired.

A still further very important object of the invention resides in the provision of a fish receptacle of this nature which is exceedingly simple in construction, inexpensive to manufacture, strong and durable, compact and convenient in its arrangement of parts, thoroughly efficient and reliable in use and operation, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the receptacle embodying the features of my invention, Figure 2 is a sectional elevation thereof showing the lid open, Figure 3 is a vertical section therethrough with the lid closed, Figure 4 is an enlarged detail section showing one of the contacts mounted in the pipe rising from the lid, Figure 5 is a horizontal section taken substantially on the line 5—5 of Figure 3, Figure 6 is a horizontal section taken substantially on the line 6—6 of Figure 3, and Figure 7 is a diagrammatic view showing the wiring incident to the electric features of the invention.

Referring to the drawings in detail, it will be seen that the letter T denotes generally a tank of any desired formation but preferably including a circular bottom 5, a cylindrical wall 6 rising therefrom and a circular lid 7 hingedly connected to the wall 6 as at 8.

A receptacle 9 depends from the bottom of the lid 7. A pipe 10 rises from an opening in the lid 7 so as to communicate with the interior of the compartment 9 and the upper end of this pipe 10 is closed. A pair of diametrically opposed contact terminals 11 extend through gaskets 12 mounted in the side walls of the pipe 10 at diametrically opposite points.

A cork float 14 has a U-shaped contact 15 on the upper end thereof and the head of this contact 15 is preferably circular and rests on the contacts 11. An apertured detent 16 is formed in the bottom of the receptacle 9 and a needle valve 17 cooperates therewith being threadedly mounted in a sleeve 18 depending from the lid 7 and extending up through an opening in the lid and terminating in a knob 19 for easy actuation from the exterior of the tank T. The water dripping from the aperture detent 16 absorbs air to be breathed by the fish in the tank T.

A pipe 20 depends from the bottom of the compartment 9 and has a stop pin 21 across the bottom end thereof. An electro-magnet 22 is mounted in the upper portion of the pipe 20. A pair of spaced contacts 23 are mounted across the pipe 20 immediately below the electro-magnet 22.

A cork float 25 is mounted in the lower portion of the pipe 20 and has a contact plate 26 on the upper face thereof to engage the contact 23.

A housing 27 depends from the central portion of the lid 7 into the compartment 9 and has mounted therein an electric motor 28 operatively connected with a pump 29 the outlet pipe 30 of which extends through the side wall of the housing 27 terminating in the compartment 9 while the intake pipe 31 extends through the side wall of the housing 27 and down through the bottom of the compartment 9 terminating at approximately the same level as the bottom end of the pipe 20 and preferably adjacent thereto.

A perforated tray 33 has a rod 34 rising from the center thereof and pivotally connected with the link 35. The link 35 is pivotally connected with a rod 36 depending from the center of the bottom of the compartment 9. Thus it will be seen that when the lid 7 is swung to a raised position as shown in Figure 3 the tray is raised through the rods 34 and 36 and the link 35 into the upper end of the tank T so that the fish may be easily removed and then when the lid is closed the tray moves down to a position almost touching the bottom 5.

Particular attention is directed to Figure 7 wherein it will be seen that battery 40 which is located in the housing 27 has a wire leading from one terminal to one of the terminals 11 as indicated at 41.

A wire 42 leads from the other terminal 11 to one of the contacts 23. A wire 24 leads from the other contact 23 to the electro-magnet 2. A wire 25 leads from the electro-magnet to the motor 28 and the wire 29 leads from the motor 28 to the battery 40.

When water is poured into the tank and reaches the level just a little above the section line 6—6 in Figure 3 it will be seen that the float 25 will be raised to a position so as to bridge the contacts 23 with the plate 26 thereby closing the circuit so that the pump 29 is operated to suck water up from the tank through the inlet pipe 31 and out through the outlet pipe 30 to closely fill the compartment 9.

When the water in the compartment 9 rises to such a level as to raise the float 14 it will be seen that the contact 15 is released from the contact 11 thereby breaking the circuit. Breaking of the circuit causes de-energization of the electro-magnet 22 which has been holding the float 25 raised and therefore this float 25 will fall down to the level of the water in the tank T or on to the pin 21.

Now the water which has been collected in the compartment 9 will slowly drip through the apertured detent 16. The speed of this dripping water may be regulated by a needle valve 17. Thus it will be seen that a constant circulation of water is provided so that live fish may be stored in the tank indefinitely.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a device of the class described, a tank, a lid hingedly mounted on the tank, a compartment depending from the lid into the tank, a pipe depending from the bottom of the compartment, an electro-magnet in the pipe, a pair of spaced contacts in the pipe below the electro-magnet, a float in the pipe having a bridge plate thereon for said contacts, said electro-magnet holding the bridge plate in connection with said contacts when the circuit to the electro-magnet is closed a pipe rising from the lid in communication with the compartment, a float in the last mentioned pipe, contacts on opposite sides of the last mentioned pipe, a contact on the float adapted to rest on the contacts in the last mentioned pipe, the bottom of said compartment being formed with an aperture, a needle valve associated with said aperture, a housing depending from the lid, a storage battery in the housing, a motor and a pump in the housing and operatively connected together, an inlet pipe connected to the pump and terminating in the tank, an outlet pipe connected with the pump and terminating in the compartment, a circuit connecting the battery with the contacts of the first and second mentioned pipes and with the motor and electro-magnet.

2. In a device of the class described, a tank, a lid hingedly mounted on the tank, a compartment depending from the lid into the tank, a pipe depending from the bottom of the compartment, an electro-magnet in the pipe, a pair of spaced contacts in the pipe below the electro-magnet, a float in the pipe having a bridge plate thereon for said contacts, said electro-magnet holding the bridge plate in connection with said contacts when the circuit to the electro-magnet is closed a pipe rising from the lid in communication with the compartment, a float in the last mentioned pipe, contacts on opposite sides of the last mentioned pipe, a contact on the float adapted to rest on the contacts in the last mentioned pipe, the bottom of said compartment being formed with an aperture, a needle valve associated with said aperture, a housing depending from the lid, a storage battery in the housing, a motor and a pump in the housing and operatively connected together, an inlet pipe connected to the pump and terminating in the tank, an outlet pipe connected with the pump and terminating in the compartment, a circuit connecting the battery with the contacts of the first and second mentioned pipes and with the motor and electro-magnet, a rod depending from the compartment, a lid pivotally connected with the rod, an apertured tray, a rod rising from the apertured tray and pivotally connected with the link.

3. In a device of the class described comprising a tank, a compartment, in the top of the tank, the bottom of the compartment having a hole therein for permitting water in the compartment to pass into the tank, a valve for controlling such hole, means for transferring water from the tank to the compartment, means for operating the transfer means when the compartment becomes empty, said means including a float in the tank, a circuit in which the transfer means are located and said circuit being closed when the float is in raised position, a magnet in the circuit holding the float in raised position, and a second float in the compartment, and carrying means for breaking the circuit when the compartment contains enough water to raise the second float, whereby the transfer means is stopped.

In testimony whereof I affix my signature.

PHILANDER D. MORGAN.